United States Patent [19]
Baldwin et al.

[11] Patent Number: 5,359,883
[45] Date of Patent: Nov. 1, 1994

[54] APPARATUS AND METHOD FOR ANALYZING EVENTS FOR AN INTERNAL COMBUSTION ENGINE

[75] Inventors: Darryl D. Baldwin, Lacon; Tien D. Doan, Peoria, both of Ill.

[73] Assignee: Caterpillar Inc., Peoria, Ill.

[21] Appl. No.: 106,725

[22] Filed: Aug. 16, 1993

[51] Int. Cl.$^5$ ............................................. G01L 23/00
[52] U.S. Cl. ................... 73/117.3; 73/119 A; 123/425
[58] Field of Search ............... 73/117.3, 119 A; 364/424.03, 431.01, 431.03, 431.05, 431.08; 123/425, 435

[56] References Cited

U.S. PATENT DOCUMENTS

| | | | |
|---|---|---|---|
| 4,257,260 | 3/1981 | Beatson et al. | 73/119 A |
| 4,292,841 | 10/1981 | Wesley | 73/119 A |
| 4,760,830 | 8/1988 | Bullis et al. | 73/117.3 |
| 4,867,124 | 9/1989 | Javaherian | 123/425 |
| 5,127,262 | 7/1992 | Demizu et al. | 73/117.3 |

OTHER PUBLICATIONS

Snap-On Tools Catalog #100, 1991, p. 370.
"Thermodynamic Analysis of Combustion Engines", Ashley S. Campbell, pp. 97–111 and Appendix, Copyright 1979.

Primary Examiner—Hezron E. Williams
Assistant Examiner—James M. Olsen
Attorney, Agent, or Firm—David M. Masterson

[57] ABSTRACT

In one aspect of the present invention, an apparatus for analyzing a plurality of events of an internal combustion engine is provided. A crankshaft sensor monitors the rotational position of the crankshaft and responsively produces a crankshaft pulsetrain. A cylinder pressure sensor senses the pressure produced in the engine cylinder and responsively produces a cylinder pressure signal. A memory device stores previously calculated values representing engine cylinder volumes at predetermined crankshaft positions. A microprocessor determines the start of combustion for an occurring engine cycle in response to a cylinder pressure signal magnitude, $P_2$, at a current crankshaft position being equal or greater than the relationship:

$$P_1(V_1/V_2)^n$$

where, $P_1$ equals the cylinder pressure corresponding to a previous crankshaft position, $V_1$ equals cylinder volume corresponding to the previous crankshaft position, $V_2$ equals the cylinder volume corresponding to the current crankshaft position, and n equals a predetermined polytropic value. Advantageously, the start of combustion is determined prior to the next occurring engine cycle.

17 Claims, 8 Drawing Sheets

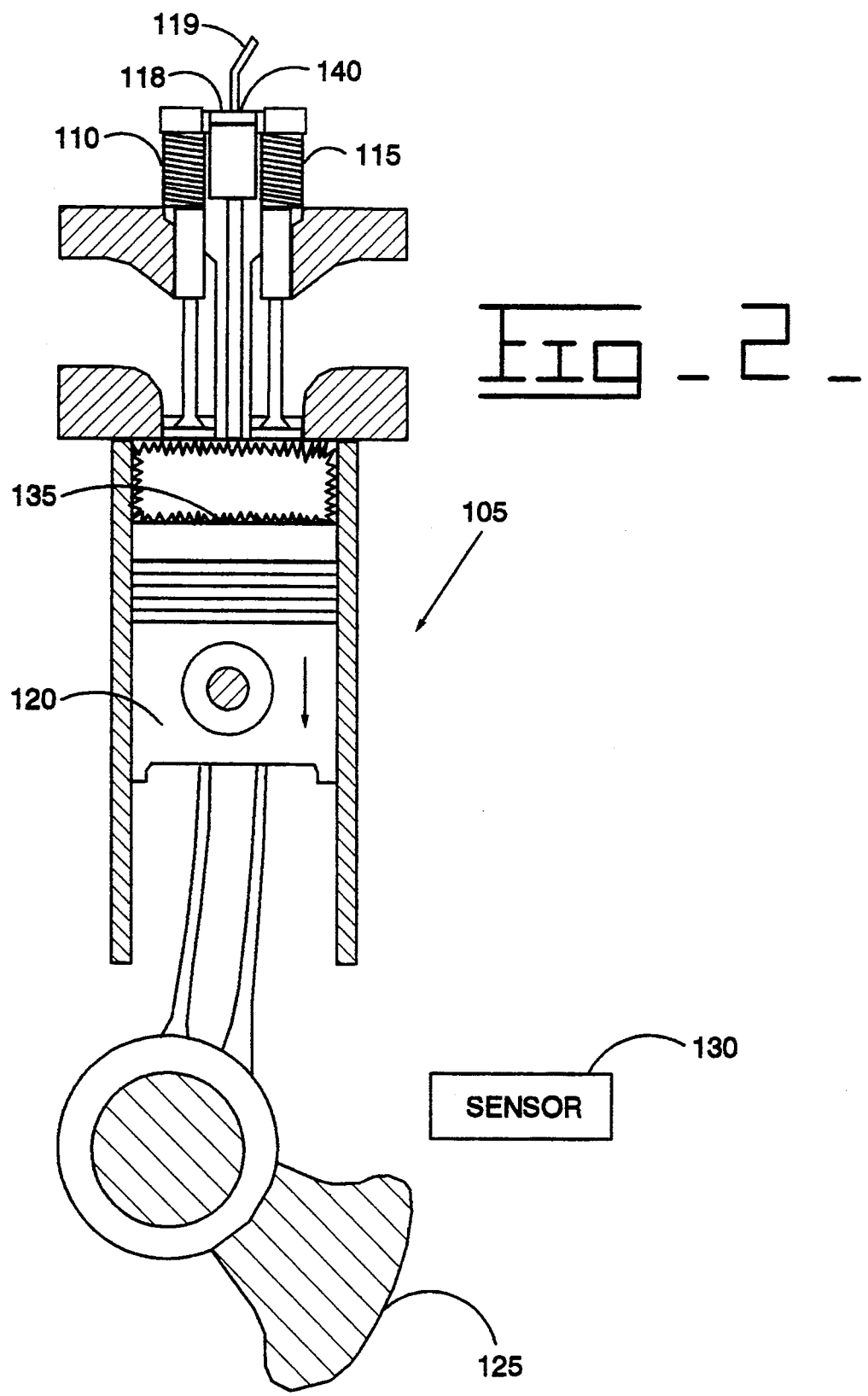
Fig_2_

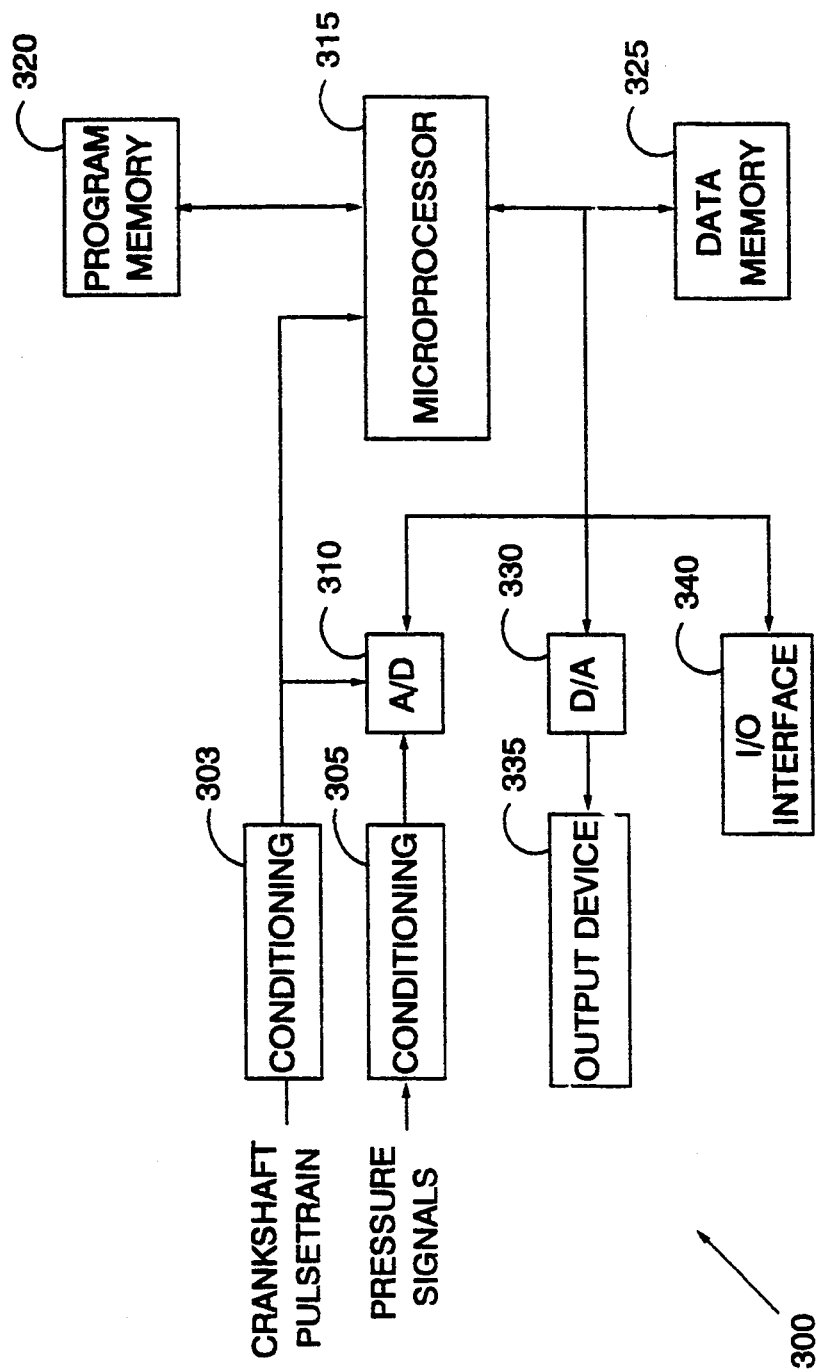

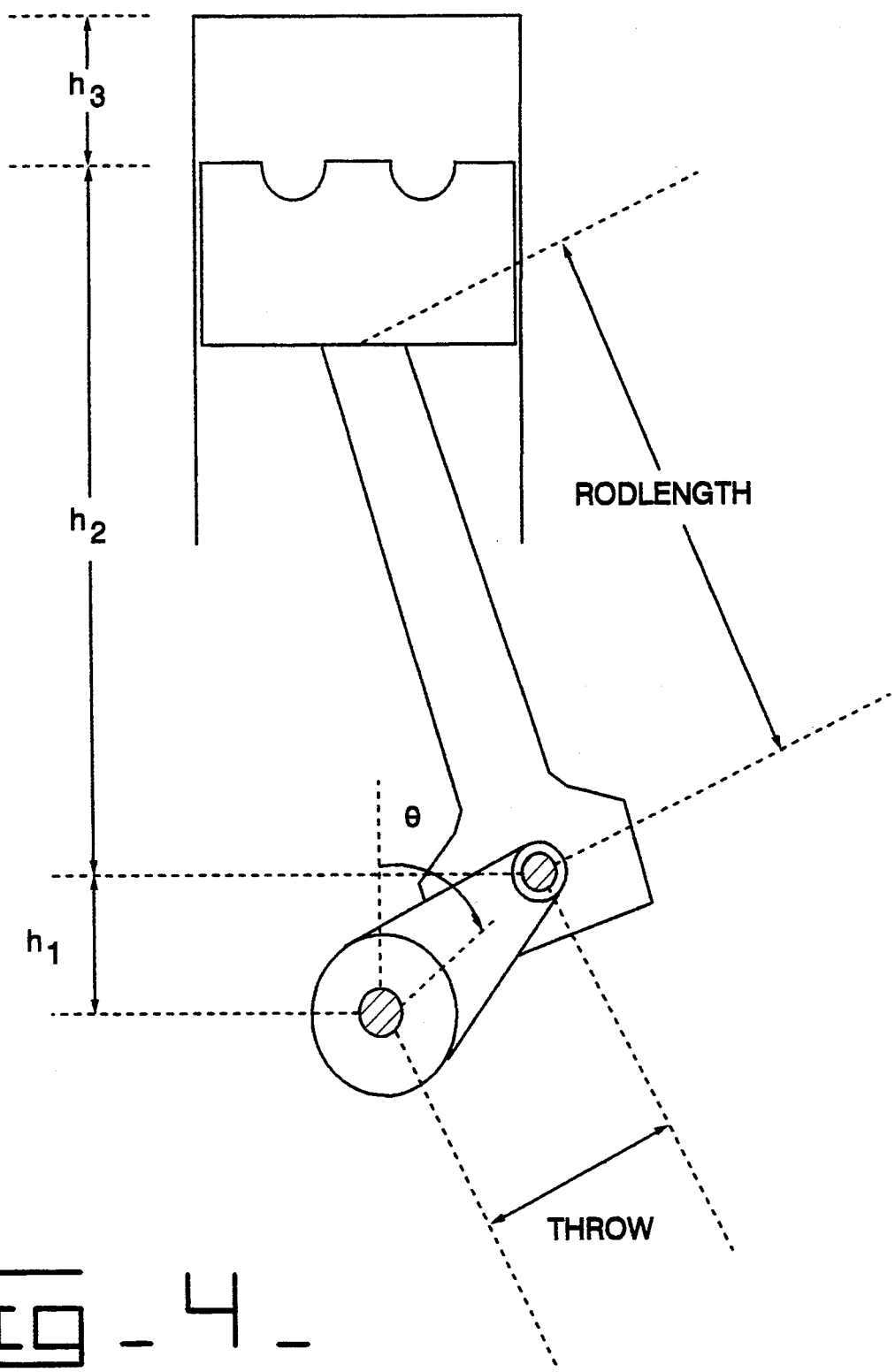
Fig-4-

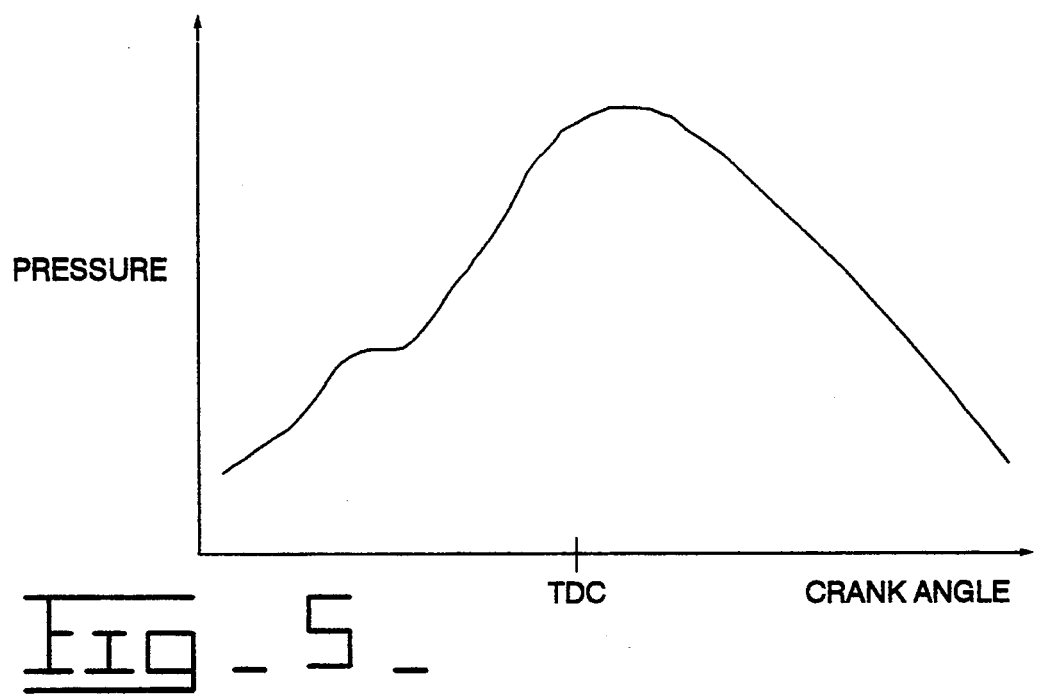
Fig_5_
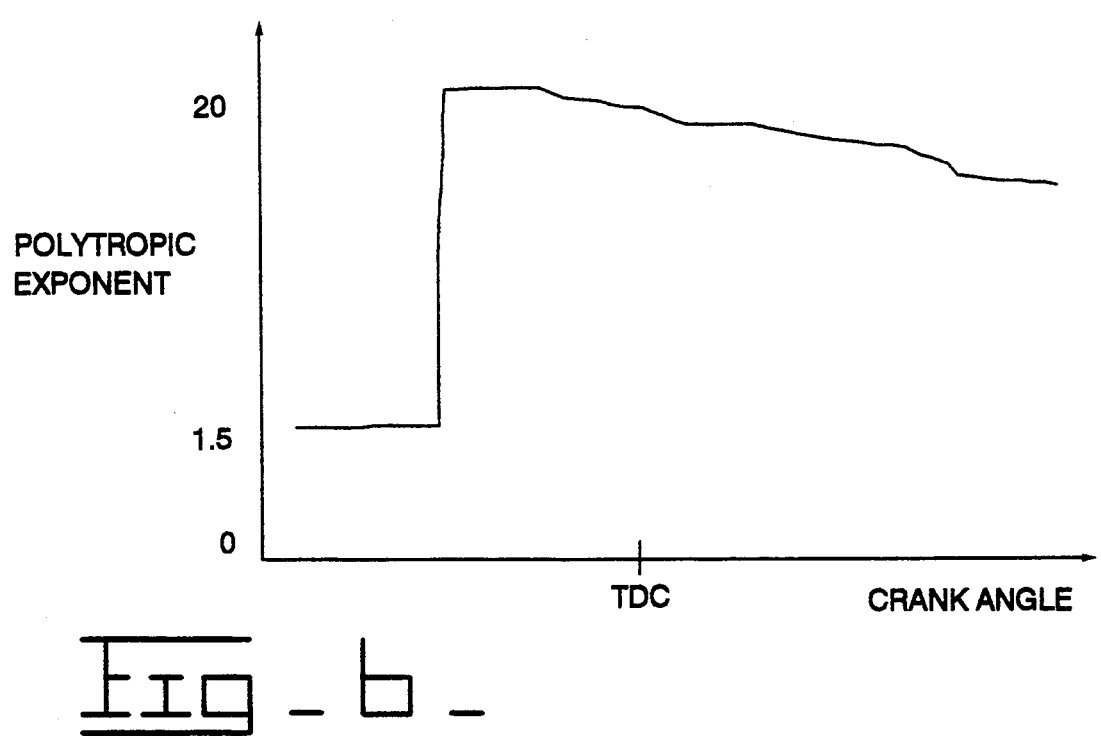
Fig_6_

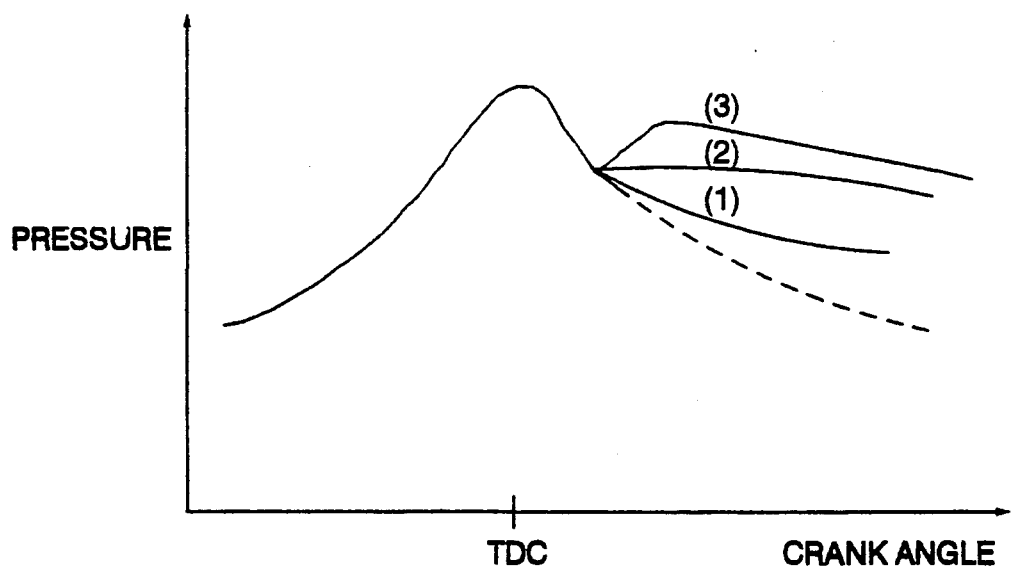
Fig_7_
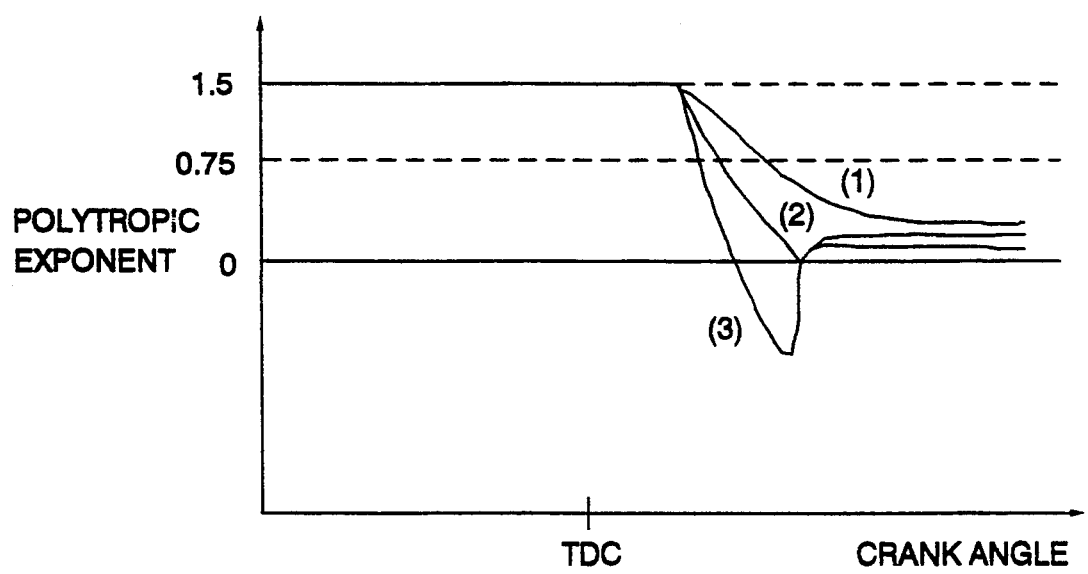
Fig_8_

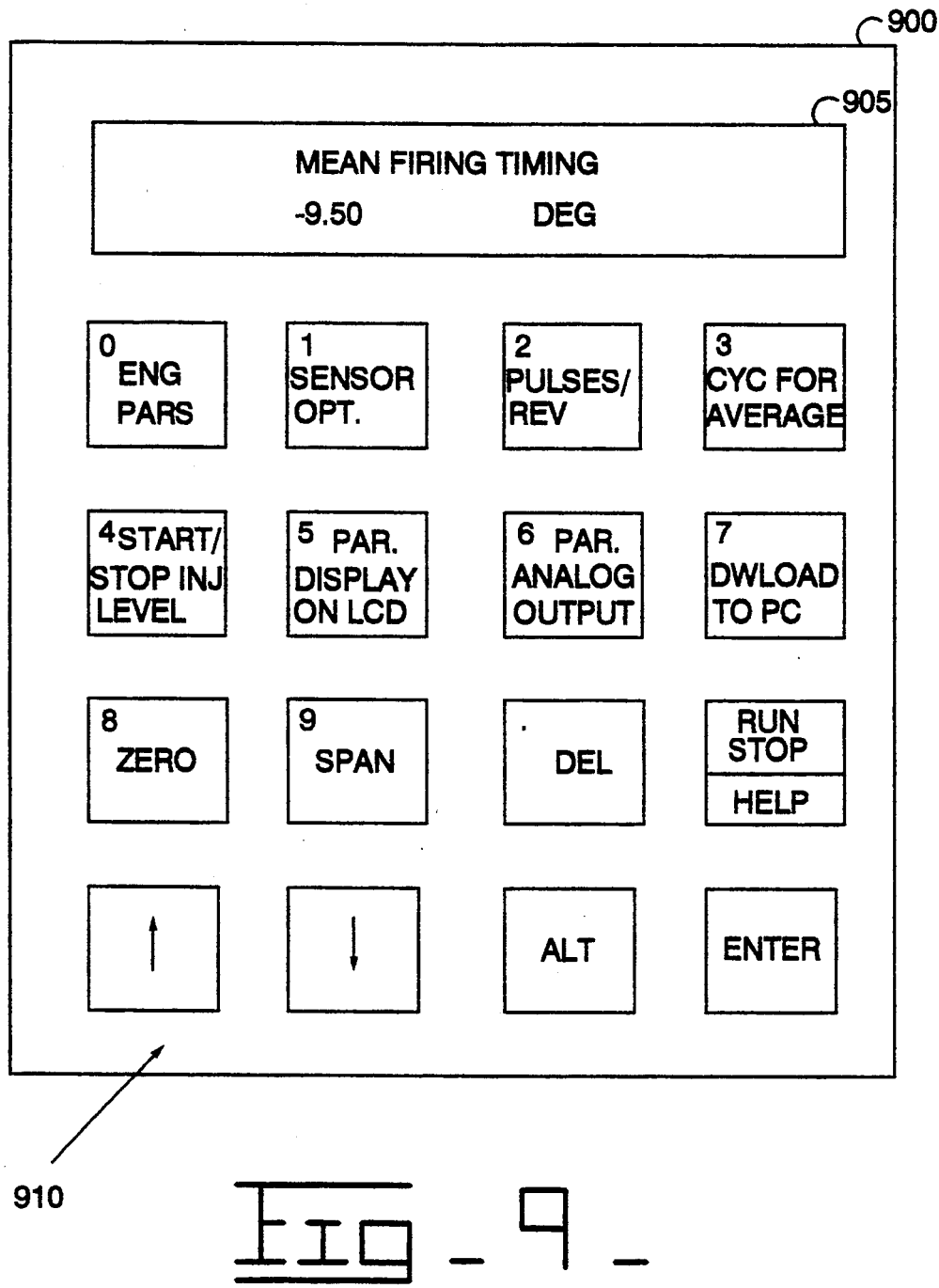
FIG_9

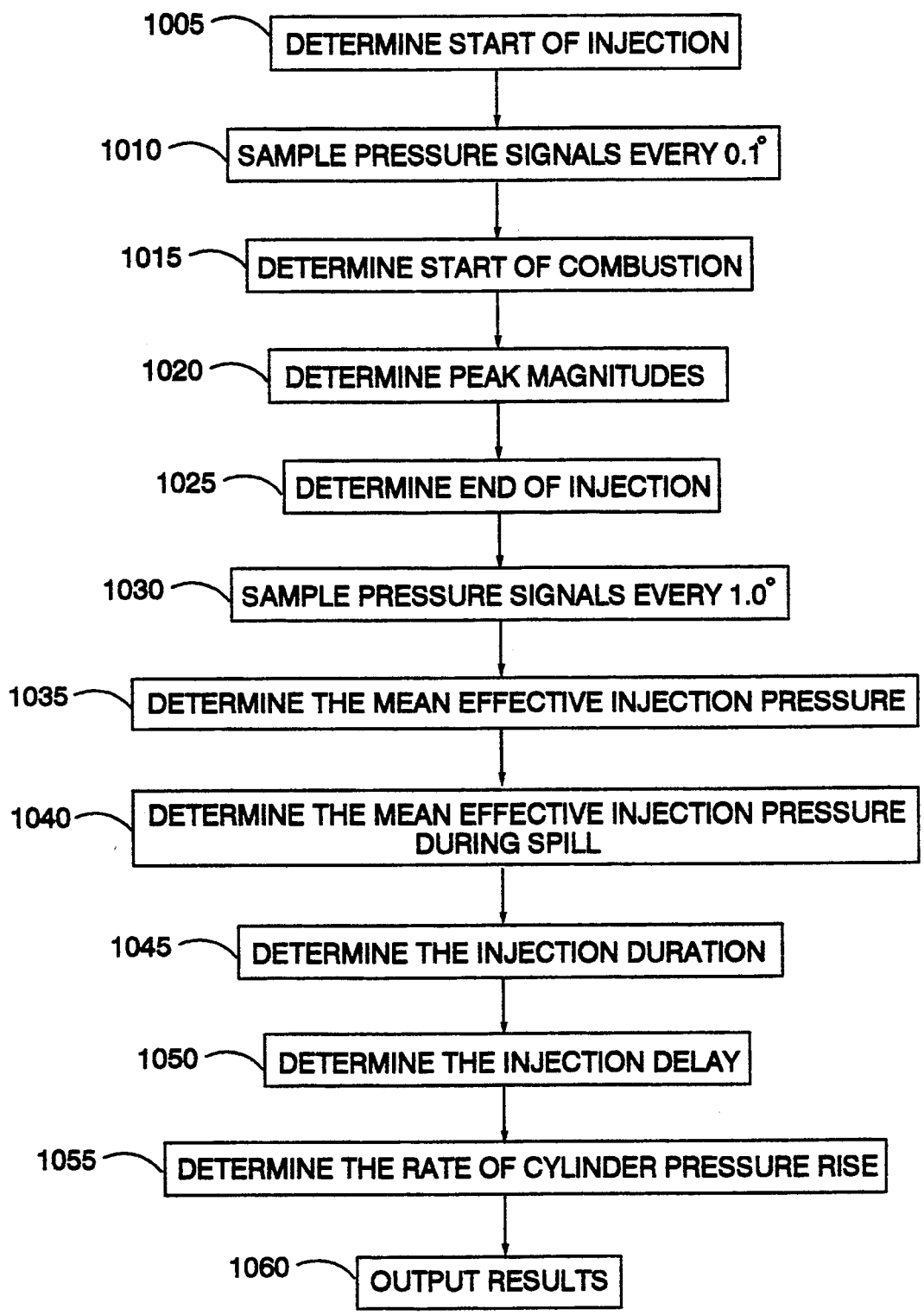
Fig_10_

APPARATUS AND METHOD FOR ANALYZING EVENTS FOR AN INTERNAL COMBUSTION ENGINE

TECHNICAL FIELD

This invention relates generally to an apparatus for analyzing events for an internal combustion engine and, more particularly, to determining the start of combustion of an internal combustion engine cylinder relative to crankshaft position.

BACKGROUND ART

Typically engine events are monitored using analog storage devices, i.e. oscilloscopes. The test engineer analyzes the cylinder and fuel injector pressure using an oscilloscope to determine engine performance. Unfortunately interpretation of the signals as viewed on the oscilloscope varies from one engineer to the next. Thus accurate analysis is dependent on the skill of the engineer to accurately use the oscilloscope and also on the accuracy of the oscilloscope. Due to human error, poor measurement repeatability results in poor accuracy.

One method to improve the above test procedure is using signal processing techniques that differentiate the cylinder pressure signal to determine the start of combustion. For example, under normal engine operating conditions, the cylinder pressure increases at the highest rate in response to combustion occurring in the cylinder. This method differentiates the cylinder pressure signal with respect to the crankshaft angle to determine the highest rate of cylinder pressure increase. It is supposed that the highest rate of cylinder pressure increase is associated with the start of combustion in the cylinder. However this does not always hold true. For example when the engine is under a heavy load, the cylinder pressure greatly increases during the compression stroke. Thus the greatest pressure increase may not be due to the start of combustion. Furthermore when the engine is retarded, combustion occurs after top dead center. Once again the highest pressure increase may not be associated with the start of combustion. Albeit such differentiation techniques are useful, they are; however, prone to produce inaccurate results.

The present invention is directed to overcoming one or more of the problems as set forth above.

DISCLOSURE OF THE INVENTION

In one aspect of the present invention, an apparatus for analyzing a plurality of events of an internal combustion engine is provided. A crankshaft sensor monitors the rotational position of the crankshaft and responsively produces a crankshaft pulsetrain. A cylinder pressure sensor senses the pressure produced in the engine cylinder and responsively produces a cylinder pressure signal. A memory device stores previously calculated values representing engine cylinder volumes at predetermined crankshaft positions. A microprocessor determines the start of combustion for an occurring engine cycle in response to a cylinder pressure signal magnitude, $P_2$, at a current crankshaft position being equal or greater than the relationship:

$$P_1(V_1/V_2)^n$$

where, $P_1$ equals the cylinder pressure corresponding to a previous crankshaft position, $V_1$ equals cylinder volume corresponding to the previous crankshaft position, $V_2$ equals the cylinder volume corresponding to the current crankshaft position, and $n$ equals a predetermined polytropic value. Advantageously, the start of combustion is determined prior to the next occurring engine cycle.

BRIEF DESCRIPTION OF THE DRAWINGS

For a better understanding of the present invention, reference may be made to the accompanying drawings in which:

FIG. 2 shows a cross sectional view of an engine cylinder during the power stroke;

FIG. 3 shows a block diagram of the electronic circuitry associated with a preferred embodiment of the present invention;

FIG. 4 shows a diagrammatic view of an engine cylinder and the related parameters;

FIG. 5 is a plot showing cylinder pressure vs. crankshaft position, where combustion occurs before top dead center;

FIG. 6 is a plot showing the polytropic exponent vs. crankshaft position, where combustion occurs before top dead center;

FIG. 7 is a plot showing cylinder pressure vs. crankshaft position, where combustion occurs after top dead center;

FIG. 8 is a plot showing the polytropic exponent vs. crankshaft position, where combustion occurs after top dead center;

FIG. 9 shows an operator interface associated with the preferred embodiment of the present invention; and FIG. 10 is a flowchart illustrating a computer software program for implementing the preferred embodiment of the present invention.

BEST MODE FOR CARRYING OUT THE INVENTION

Figure 1:
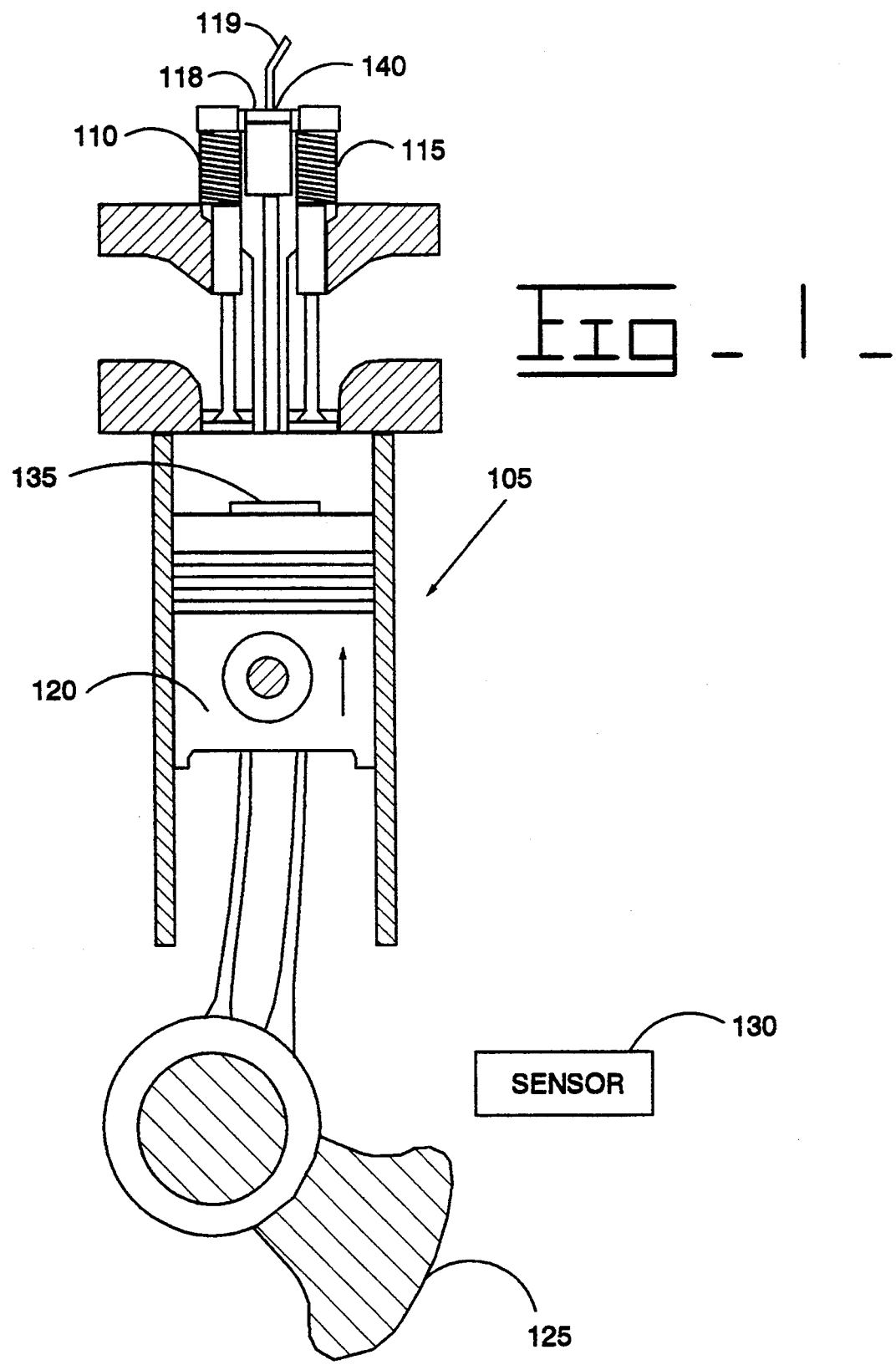
FIG. 1 shows a cross sectional view of an engine cylinder during the compression stroke.

FIG. 1 shows a diagrammatic view of an internal combustion engine cylinder 105. The engine includes an intake valve 110, an exhaust valve 115 and a fuel injector 118. A reciprocating piston 120 is disposed inside the cylinder 105 and is connected to an engine crankshaft 125.

During normal engine operation, the piston 120 travels through four strokes: intake, compression, power and exhaust—FIG. 1 illustrates the compression stroke. As shown all the valves 110,115 are closed and the piston 120 moves upward in the cylinder 15 compressing air. As the air is compressed the air temperature dramatically increases. As the piston 120 nears the top of the stroke, fuel is injected into the combustion chamber at the top of the piston 120. The fuel mixes with the hot compressed air and causes combustion. As shown in FIG. 2, the force of the combustion causes the piston to move downward, thereby turning the crankshaft 125. To determine engine performance, it is desirable to accurately determine the rotational position of the crankshaft 125 when combustion occurs.

A crankshaft sensor 130 that is disposed adjacent the crankshaft flywheel monitors the rotational position of the engine crankshaft 125 and responsively produces a crankshaft pulsetrain. The crankshaft sensor 130 may be an optical or magnetic type sensor. For example, the crankshaft sensor may be similar to that provided by Sequential Electronic Systems of Elmsford, N.Y. as model no. 30GN. A cylinder pressure sensor 135 that is disposed on the top of the piston 120 monitors the pressure created in the engine cylinder 105, and responsively produces a cylinder pressure signal. The cylinder pressure sensor 135 may be of a piezoelectric construction. A fuel injector pressure sensor 140 may be disposed in the fuel injector 118 or the fuel line 119. For example, the cylinder pressure sensor 135 may be similar to that provided by Kistler Instrument AG of Winterthur, Switzerland as model no. 6061. The fuel injector pressure sensor monitors the injection pressure and responsively produces an injector pressure signal. The fuel injector pressure sensor 140 consists of a strain gauge. The injector pressure sensor 140 is similar to that provided by Micro Measurement as model no. CEA-06-062-UW-350, for example.

With reference to FIG. 3, the present invention provides an apparatus 300 that receives and conditions the above signals to perform the desired engine event analysis. The crankshaft pulsetrain is delivered to signal conditioning circuitry 303 to "sharpen" the associated waveform in a well known manner. The pressure signals are delivered to signal conditioning circuitry 305 to condition the associated waveforms. An analog to digital (A/D) circuit 310 receives the conditioned pressure signals and transforms the associated waveforms into microprocessor readable data. A microprocessor 315 receives the digitized pressure signals and the crankshaft pulsetrain, and determines various engine events relative to the crankshaft position. The microprocessor 315 includes program memory 320 to store a series of instructions that enable the microprocessor to perform the analysis. Peripheral memory 325 is included to store data generated by the sensors and data generated by the microprocessor 315. Digitized data representing the engine events may be delivered to a digital to analog (D/A) circuit 330 to provide for analog data representation. For example, engine event data may be displaced on an output device 335 consisting of an analog plotter, chart recorder, oscilloscope, or the like. An input/output (I/O) interface 340 is included to provide for direct communication between the operator and the microprocessor 315.

Preferably the microprocessor is similar to that provided by Texas Instruments as model no. TMS320C30. This particular type of microprocessor has digital signal processing capability.

The block diagram of FIG. 3 depicts a complete working model of the present invention. The specific circuit configuration to carry-out the invention is a matter of design choice and is not critical to the present invention. However a more detailed description of the circuitry is provided in application no. 08/043,197 filed on Apr. 5, 1993 assigned to Caterpillar, Inc., which is hereby incorporated by reference.

The most complex engine event to be determined is the start of combustion. The start of combustion is used to determine the ignition delay and to correlate the desired timing to the actual timing. The determination of the start of combustion is based on the following relationships, and is fully discussed below.

For example, the total cylinder pressure at combustion is shown in eq. 1, where $$\text{Cylinder Pressure} = P_p + P_c \qquad (1)$$

$P_p$ = pressure resulting from piston movement; and
$P_c$ = pressure resulting from combustion.

Although it appears that the cylinder pressure would increase at the highest rate at combustion, this is not always true. For example, when the engine is operating at a high-load condition, the cylinder pressure during the compression stroke changes at a higher rate than that of normal-load conditions. Consequently, the highest rate of cylinder pressure increase may not be at the start of combustion, but instead may be at some period during the compression stroke. Thus, such techniques that use first or second derivative of cylinder pressure may not accurately identify the start of combustion.

During the compression stroke of the engine prior to combustion, a trapped mass of fuel or fuel/air mix is compressed in the cylinder. There is a relationship between the volume of the cylinder and the resulting pressure as shown in eq. 2.

$$P_1 V_1^n = P_2 V_2^n \qquad (2)$$

Where,
$P_1$ = cylinder pressure corresponding to the previous crankshaft position;
$P_2$ = cylinder pressure corresponding to the instantaneous crankshaft position;
$V_1$ = cylinder volume corresponding to the previous crankshaft position; and
$V_2$ = cylinder volume corresponding to the current crankshaft position.

With reference to FIG. 4, the cylinder volume, $V(\Theta)$, can be computed from the following relationships:

$$V(\Theta) = \frac{\text{Bore}^2}{4} \times \pi \times h3 + \text{Volume at } TDC \qquad (3)$$

Where:
h3 = Throw + Rodlength − h1 − h2
h1 = Throw × cos ($\Theta$)
h2 = Rodlength × cos (asin(1/Rodlength))
1 = Throw × sin ($\Theta$)

$$\text{Vol at } TDC = \frac{(\text{Bore}^2/4 \times \pi \times \text{Stroke})}{(\text{Compression Ratio} - 1)}$$

Throw = Stroke/2

The term, n, is referred to as the polytropic exponent, and can be derived from:

$$n = \frac{\log(P1/P2)}{\log(V2/V1)} \qquad (4)$$

During the compression and expansion strokes of an engine, the polytropic exponent has been determined to be 1.3. When combustion begins, energy is released from the fuel and the temperature and pressure of the gas in the cylinder exceed those temperatures and pressures associated with the compression stroke. Here, the computed value of the polytropic exponent typically exceeds 5, and may be as much as 15–20.

The combustion associated with diesel engines typically causes a large amount of pressure, which combines with the pressure caused by the piston movement. Consequently the polytropic exponent increases in a rapid manner. For example, FIG. 5 shows the cylinder pressure signal relative to the crankshaft position, where the combustion occurs prior to top dead center (TDC). Accordingly FIG. 6 shows the respective value of the polytropic exponent relative to the crankshaft position.

The rate of increase and the peak of the polytropic exponent depends primarily on the strength of combustion, e.g. the amount of fuel being injected, etc. Empirical data has shown that the start of combustion is associated with a predetermined polytropic value, e.g. 3.0. Thus, eq. JMO (4) may be used to calculate the polytropic exponent at incremental crankshaft positions. When the calculated polytropic exponent is equal to or greater than the predetermined polytropic value, combustion is said to occur.

Unfortunately currently available processing technology cannot perform the calculations shown in eq. (4) in a real-time basis because of the high sampling rate required for high accuracy (0.1° crankshaft rotation). Thus currently available engine analysis techniques have heretofore been unable to determine the start of combustion in real-time, i.e. determine the start of combustion during the current engine cycle.

However, Eq. (2) may be rewritten as:

$$P_2 = P_1(V_1/V_2)^n \qquad (5)$$

Empirical data has shown that the start of combustion occurs when eq. (5) has been satisfied. Advantageously, the present invention uses the following relationship to determine the crankshaft position at which the start of combustion occurs:

$$P_2 >= P_1(V_1/V_2)^n \qquad (6)$$

Since the calculations corresponding to eq. (6) are relatively simple, the microprocessor 315 is capable of completing the calculation before the next pressure sample is produced. For example, the factor, $(V_1/V_2)^n$, is precalculated and is stored in a look-up table located in program memory 320. Each factor corresponds to a predetermined crankshaft position. Thus, the present invention is able to determine the start of combustion in real-time and with high accuracy.

The above discussion pertains to determine the start of combustion that occurs prior to TDC. However, the combustion may occur after TDC, e.g. to lower the $NO_x$ production.

FIG. 7 shows the cylinder pressure signal when combustion occurs after TDC. The dashed line represents the ideal cylinder pressure. However, the resulting pressure is shown by traces (1)-(3), where trace (1) represents the strongest combustion and trace (3) represents the weakest. Regardless of the strength of combustion, the polytropic exponent has been observed to decrease from a nominal value of 1.5 to a value of 0.75, for example, as shown in FIG. 8. A second predetermined polytropic value of 0.75 is then chosen. Thus, when the crankshaft position is beyond TDC the factor, $(V_1/V_2)^n$ is pre-computed using a value of 0.75 for n.

Note that the plots and polytropic values shown herein are for illustrative purposes only and not to limit the present invention.

Industrial Applicability

As stated above the present invention is adapted to analyze a plurality of engine events. Advantageously the present invention uses digital technology to perform the necessary calculations in an accurate manner and in real-time.

An example of the operation of the present invention is now discussed in relation to FIG. 9. FIG. 9 represents an operator interface 900, which includes an Liquid Crystal Display (LCD) 905 to view analysis data, and a key pad 910 that has a plurality of operator settings. The operator interface 900 allows the operator to input data to set-up the analysis and provides a visual feedback to allow the operator to monitor the results. To initiate the analysis the operator enters set-up information via the key pad 910. For example, the set-up information may include the number of pulses per revolution produced by the crankshaft sensor 130. Once the set-up is complete, the test may begin.

Reference is now made to the flowchart of FIG. 10 to illustrate the sequence of the engine event analysis. The start of injection is the first engine event that is determined, which is indicated by block 1005. For example, the microprocessor 315 receives the cylinder pressure signal and crankshaft pulse train, compares the magnitude of the injector pressure signal to a upper predetermined injector pressure value, and responsively determines the start of injection (relative to the crankshaft position) in response to the injector pressure signal magnitude being equal or greater than the upper predetermined injector pressure value. Once the start of injection is determined, the control proceeds to block 1010.

At block 1010 the A/D 310 samples the pressure signals at a rate corresponding to a 0.1° angular rotation of the crankshaft. This high sampling rate is controlled by the crankshaft pulsetrain, which provides the high accuracy required to determine the start of combustion as indicated by block 1015. Accordingly the microprocessor 315 receives the cylinder pressure signal and crankshaft pulse train and determines the start of combustion relative to the crankshaft position in accordance with the above described calculations.

Control then proceeds to block 1020, where the peak magnitudes of the pressure signals are determined and stored in memory 325 for subsequent calculations. Typically the peak magnitudes of the pressure signals will occur after the start of combustion and before the end of injection. After the peak magnitudes have been determined, control then passes to block 1025 where the end of injection is determined. For example, the microprocessor 315 determines the end of injection in response to the injector pressure signal magnitude being equal or less than a lower predetermined injector pressure value. Once the end of injection is determined, control proceeds to block 1030.

At block 1030 the A/D 310 samples the pressure signals at a rate corresponding to a 1.0° angular rotation of the crankshaft. This lower sampling rate is controlled by the microprocessor 315. The following calculations do not require as great of a sampling rate as the calculations discussed above. Since the microprocessor 315 controls the data sampling, a lower sampling rate allows the microprocessor 315 to spend greater processing time to determine the following engine events in real-time.

At block 1035 the mean effective injection pressure is determined (the mean effective injection pressure during injection). For example, the microprocessor 315 determines the mean effective injection pressure in response to numerically integrating the injector pressure signal during the period that corresponds to the start of injection until the end of injection.

At block 1040 the mean effective injection pressure during injector spill is determined. For example, the microprocessor 315 determines the mean effective injection pressure during injector spill in response to numerically integrating the injector pressure signal during the period that corresponds to the maximum injection pressure until the end of injection.

At block 1045 the injection duration is determined (the period that fuel is being injected). For example, the microprocessor 315 determines the injection duration in response to calculating the amount of crankshaft rotation between the start of injection and the end of injection.

At block 1050 the injection delay is determined (the period from the start of injection to the start of combustion). For example, the microprocessor 315 determines the injection delay in response to calculating the amount of crankshaft rotation from the start of injection to the start of combustion.

At block 1055 the rate of cylinder pressure rise is determined (the maximum rate of increase of cylinder pressure). For example, the microprocessor 315 determines the rate of the cylinder pressure rise in response to numerically differentiating the cylinder pressure signal during a complete engine cycle. The rate of cylinder pressure rise aids to determine combustion noise and piston structural limitations.

Finally, at block 1060, the results of the analysis may be recorded "real-time" on a strip chart recorder or recorded on a data acquisition device for a more complex analysis.

As described the present invention takes advantage of digital technology to accurately analyze engine events on a real-time basis. Thus, the above measurements and computations can be time-correlated to other real-time systems to determine the mechanical and structural rigidity of the engine. The resulting JMO data can therefore be utilized by engineers to determine and predict engine performance to aid in high quality engine design.

Other aspects, objects and advantages of the present invention can be obtained from a study of the drawings, the disclosure and the appended claims.

We claim:

1. An apparatus for analyzing a plurality of events of an internal combustion engine having at least one cylinder, a rotatable crankshaft and a reciprocating piston, the cylinder having a fuel injector, an intake valve and an exhaust valve, comprising:

a crankshaft sensor being adapted to monitor the rotational position of the crankshaft and responsively produce a crankshaft pulsetrain;

a cylinder pressure sensor being adapted to sense the pressure produced in the engine cylinder and responsively produce a cylinder pressure signal corresponding to predetermined crankshaft positions;

memory means for storing precalculated values representing a plurality of engine cylinder volumes at predetermined crankshaft positions; and processing means for receiving the crankshaft pulsetrain and cylinder pressure signals and determining the start of combustion for occurring engine cycle relative to the crankshaft position in response to the cylinder pressure signal magnitude, $P_2$, at a current crankshaft position being equal or greater than the following relationship:

$$P_1(V_1/V_2)^n$$

where, $P_1$ = cylinder pressure corresponding to a previous crankshaft position;

$V_1$ = cylinder volume corresponding to the previous crankshaft position;

$V_2$ = cylinder volume corresponding to the current crankshaft position; and $n$ = predetermined polytropic value;

wherein the start of combustion is determined prior to the next occurring engine cycle.

2. An apparatus, as set forth in claim 1, including an injector pressure sensor adapted to monitor the injection pressure and responsively produce an injector pressure signal corresponding to predetermined crankshaft rotations.

3. An apparatus, as set forth in claim 2, including means for receiving the injector pressure signal, comparing the injector pressure signal magnitude to an upper predetermined injector pressure value and responsively determining the start of injection in response the injector pressure signal magnitude being equal or greater than the upper predetermined injector pressure value.

4. An apparatus, as set forth in claim 3, including means for comparing the injector pressure signal magnitude to a lower predetermined injector pressure value and responsively determining the end of injection in response the injector pressure signal magnitude being equal or less than the lower predetermined injector pressure value.

5. An apparatus, as set forth in claim 4, including means for determining the mean effective injection pressure in response to integrating the injector pressure signal during the period corresponding to the start of injection until the end of injection.

6. An apparatus, as set forth in claim 5, including means for determining the maximum injection pressure and calculating the mean effective injection pressure during injector spill in response to integrating the injector pressure signal during the period corresponding to the peak injection pressure until the end of injection.

7. A method for analyzing a plurality of events of an internal combustion engine having at least one cylinder and a rotatable crankshaft, the cylinder having a fuel injector, an intake valve, an exhaust valve and a reciprocating piston, comprising the steps:

monitoring the rotational position of the crankshaft and responsively producing a crankshaft pulsetrain;

sensing the pressure produced in the engine cylinder and responsively producing a cylinder pressure signal corresponding to predetermined crankshaft positions;

storing precalculated values representing a plurality of engine cylinder volumes at predetermined crankshaft positions; and receiving the crankshaft pulsetrain and cylinder pressure signals and determining the start of combustion for an occurring engine cycle relative to the crankshaft position in response to a cylinder pressure signal magnitude, $P_2$, at a current crankshaft position being equal or greater that the following relationship:

$$P_1(V_1/V_2)^n$$

where, $P_1$ = cylinder pressure corresponding to a previous crankshaft position;

$V_1$ = cylinder volume corresponding to the previous crankshaft position;

V₂ = cylinder volume corresponding to the current crankshaft position; and n = predetermined polytropic value;

wherein the start of combustion is determined prior to the next occurring engine cycle.

8. A method, as set forth in claim 7, including the step of determining the start of combustion prior to the piston reaching top dead center.

9. A method, as set forth in claim 8, including the step of determining the start of combustion subsequent to the piston reaching top dead center.

10. A method, as set forth in claim 9, including the steps of monitoring the injection pressure and responsively producing an injector pressure signal corresponding to predetermined crankshaft rotations.

11. A method, as set forth in claim 10, including the steps of receiving the injector pressure signal, comparing the injector pressure signal magnitude to an upper predetermined injector pressure value and responsively determining the start of injection in response the injector pressure signal magnitude being equal or greater than the upper predetermined injector pressure value.

12. A method, as set forth in claim 11, including the steps of comparing the injector pressure signal magnitude to a lower predetermined injector pressure value and responsively determining the end of injection in response the injector pressure signal magnitude being equal or less than the lower predetermined injector pressure value.

13. A method, as set forth in claim 12, including the steps of determining the mean effective injection pressure in response to integrating the injector pressure signal during the period corresponding to the start of injection until the end of injection.

14. A method, as set forth in claim 13 including the steps of determining the maximum injection pressure and calculating the mean effective injection pressure during injector spill in response to integrating the injector pressure signal during the period corresponding to the peak injection pressure until the end of injection.

15. A method, as set forth in claim 14, including the step of determining the injection delay in response to calculating the period from the start of injection to start of combustion.

16. A method, as set forth in claim 15, including the step of determining the injection duration in response to calculating the period from the start of injection to the end of injection.

17. A method, as set forth in claim 16, including the step of determining the rate of the cylinder pressure rise in response to differentiating the cylinder pressure signal during a complete engine cycle.

* * * * *